(12) United States Patent
McGill et al.

(10) Patent No.: US 11,300,967 B2
(45) Date of Patent: Apr. 12, 2022

(54) SYSTEM AND METHOD FOR COLLECTION OF PERFORMANCE DATA BY A VEHICLE

(71) Applicant: TOYOTA RESEARCH INSTITUTE, INC., Los Altos, CA (US)

(72) Inventors: Stephen G. McGill, Cambridge, MA (US); Guy Rosman, Newton, MA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 241 days.

(21) Appl. No.: 16/663,699

(22) Filed: Oct. 25, 2019

(65) Prior Publication Data

US 2021/0124361 A1  Apr. 29, 2021

(51) Int. Cl.
*G05D 1/02* (2020.01)
*G07C 5/00* (2006.01)
*G05D 1/00* (2006.01)

(52) U.S. Cl.
CPC ......... *G05D 1/0221* (2013.01); *G05D 1/0088* (2013.01); *G07C 5/008* (2013.01); *G05D 2201/0213* (2013.01)

(58) Field of Classification Search
CPC ............ G05D 1/0221; G05D 1/0088; G05D 2201/0213; G07C 5/008; G07C 5/085; G07C 5/0808; G07C 5/0841
See application file for complete search history.

(56) References Cited

U.S. PATENT DOCUMENTS

| 9,168,924 | B2 | 10/2015 | Lee et al. |
| 9,878,710 | B2 | 1/2018 | Schmüdderich et al. |
| 9,902,401 | B2 | 2/2018 | Stein et al. |
| 10,101,744 | B2 | 10/2018 | Reisman et al. |
| 2019/0049982 | A1* | 2/2019 | Yang ...................... G06Q 50/30 |
| 2020/0272148 | A1* | 8/2020 | Karasev ............... G05D 1/0088 |
| 2021/0208596 | A1* | 7/2021 | Tong .................... G05D 1/0221 |

FOREIGN PATENT DOCUMENTS

WO    2017165627 A1    9/2017

* cited by examiner

*Primary Examiner* — Michael J Zanelli
(74) *Attorney, Agent, or Firm* — Seyfarth Shaw LLP

(57) ABSTRACT

Systems and methods to systematically identify and collect operational vehicle data for selective transmission to a non-local storage location for further analysis and use in training autonomous and semi-autonomous vehicles are provided. The systems and methods provided overcome limitations in storage and transmission of collected data by selectively archiving only that collected driving data warranting further analysis.

18 Claims, 3 Drawing Sheets

SYSTEM AND METHOD FOR COLLECTION OF PERFORMANCE DATA BY A VEHICLE

The present disclosure relates to data collection and processing, more particularly to data collection by an autonomous or semi-autonomous vehicle based on a performance measurement in a predicted model.

BACKGROUND

Autonomous and semi-autonomous vehicles generate and collect vast amount of data. It may be advantageous to review the data collected by such a vehicle to review significant actions taken by the vehicle and why those actions were taken. The vehicle, however may not have the local resources to store and provide all of this data to a cloud server for review. That is, the amount of data generated by the vehicle cannot be efficiently and accurately transmitted to a non-local server because of the storage limitations of the vehicle the transmission limitations, such as unavailable transmission connections or low-bandwidth transmission to cloud servers, or the high-cost of the required transmission.

SUMMARY

Aspects of the present disclosure provide systems and methods to systematically identify and collect operational vehicle data for selective transmission to a non-local storage location for further analysis and use in training autonomous and semi-autonomous vehicles. According to one aspect, a method of measuring performance of a vehicle is presented. A pre-defined model may be applied to the operation of the vehicle. Operational data may be collected from the vehicle and a performance measurement may be generated from the operational data. A gain may be determined based on the performance measurement the operational data may be archived if the gain meets a threshold.

According to another aspect of the disclosure, a system for measuring performance of a vehicle is disclosed. The system may include a predictor configured to generate a predicted model and a detector configured to detect operational data from the vehicle. A processor may be configured to apply the predicted model to the operation of the vehicle, generate a performance measurement from the operational data, and determine a gain based on the performance measurement. A data collector may be configured to archive the operational data if the gain meets a threshold.

According to another aspect, a non-transitory computer-readable medium having program code recorded thereon for determining a performance measurement of a vehicle is disclosed. The program code may be executed by a processor and include program code to apply a pre-defined model to the operation of the vehicle, program code to collect operational data from the vehicle, and program code to generate a performance measurement from the operational data. The non-transitory computer-readable medium may further include program code to determine a gain based on the performance measurement; and program code to archive the operational data if the gain meets a threshold.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide systems and methods to overcome the limitations in storage and transmission of collected data by selectively archiving only that collected driving data warranting further analysis—e.g., to determine whether the ego vehicle did not properly understand the environment, whether the ego vehicle (even with a proper understanding of the environment) performed the wrong action or made a faulty prediction, or whether a driver of another road agent made an unexpected maneuver.

Figure 1:
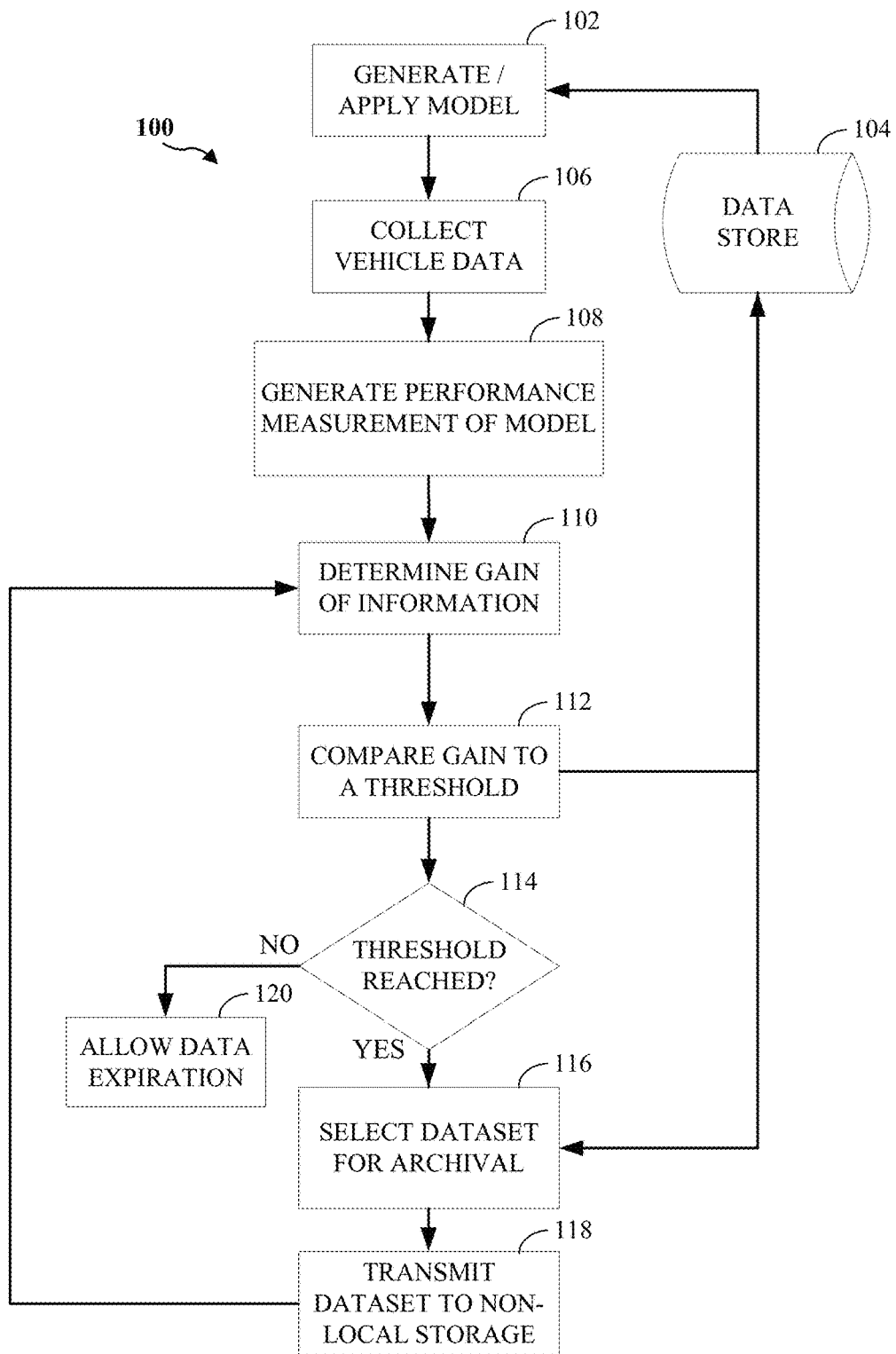
FIG. 1 depicts a method of generating a performance measurement according to an aspect of the present disclosure.

According to one aspect of the present disclosure, a system in a vehicle, referred to herein as an ego vehicle, may identify and select collected driving data for archival based on a generated performance measurement of a model, such as a trajectory prediction or route planning model. FIG. 1 depicts an exemplary method 100 of identifying and collecting data for archival according to one aspect of the present disclosure.

As shown in block 102, the system may generate and apply an operational model that is trained based on collected data from a data source, such as a local or non-local data store 104. The data store 104 may be a local data store resident on the ego vehicle, a remote data store such as a cloud server, or other storage device in communication with the ego vehicle systems. The data store 104 may also include a combination or any local or remote distributed data stores. With the generated model applied to the operational environment of the vehicle, on-board sensors, as described in greater detail herein, may collect operational and environmental data related to the performance of the vehicle as it operates or is operated.

The system may generate a performance measurement, as shown in block 108, based on the collected operational and environmental data. For example, the performance measurement may be defined as an information gain of the model trained on previously collected driving data. Data representative of already known environments and behavior pose little value to artificial intelligence systems and processes. Known data is presumably built in to the existing model and the ego vehicle may already be operating according to that data. The collection and analysis of the same or substantially similar data therefore may be duplicative and may be computationally expensive to save, transmit and analyze again.

Substantially different or new data, on the other hand, poses greater value to the model and training systems in that the new data may provide a training system additional data on which the artificial intelligence systems may be trained for future deployment in subsequent operations and vehicles. As shown in blocks 110 and 112, the system may determine the gain of information and compare the gain to a pre-defined threshold. The system may select the collected data for archival if the collected operational and environmental data results in a sufficient estimated information gain. The threshold may be indicative of whether the differences between the collected data and the known data of the model that was not trained based on the collected data are sufficient enough to warrant the computational effort and cost to archive and transmit off-vehicle for later use.

As shown in block 114, if the collected data does not exceed the threshold, the data may be allowed to expire. Expiration of the data may be an affirmative action taken by the system to delete the data from the local storage or buffer, or it may entail a more passive approach by allowing the data to be overwritten in the storage or buffer. If the data collected does indicate a sufficient information gain (i.e., the threshold is reached or exceeded), the system may select or mark such data for archival, as shown in block 118. Once the data has been identified and marked as data to be archived, the system may transmit the selected data to a non-local data store, such as a cloud server or other remote data storage location. The transmission of selected data may be substantially contemporaneously with its identification as archivable data if the resources are present to do so. Alternatively, the system may be configured to store the data locally until a retrieval operation is indicated, such as the system having access to necessary network resources or it is manually downloaded from the ego vehicle and uploaded to a server.

Figure 2:
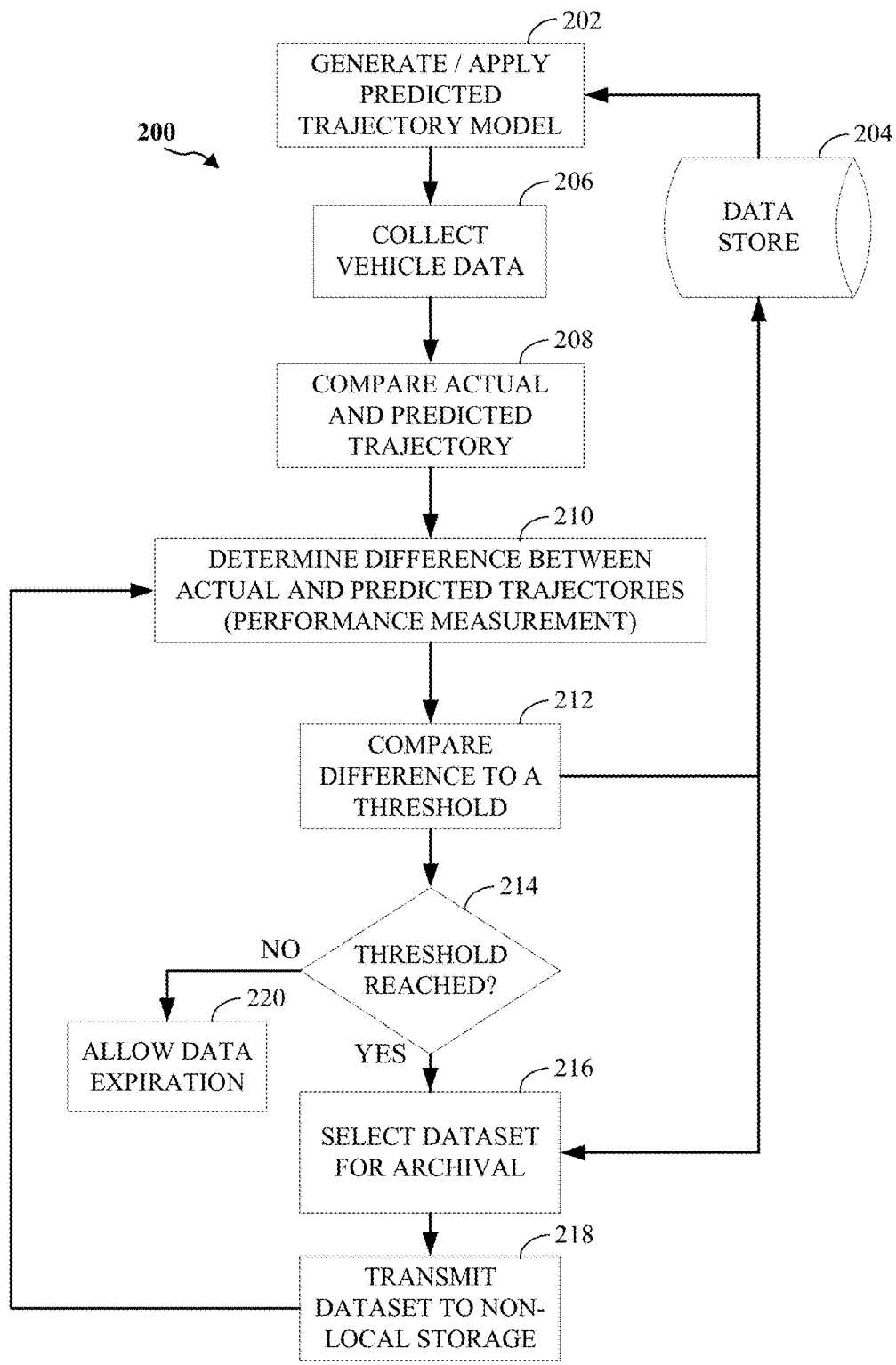
FIG. 2 depicts a method of generating a performance measurement of a predicted trajectory according to an aspect of the present disclosure.

According to another aspect of the present disclosure, the performance measurement defined and generated at the ego vehicle may include a difference between a predicted trajectory of a vehicle (the ego vehicle or other road agent) and an actual trajectory of that vehicle. The ego vehicle may identify collected driving data for archival if the difference between the predicted and actual trajectories exceeds a threshold difference. FIG. 2 depicts a method 200 of generating archival data according to one such performance measurement. An ego vehicle may comprise a trajectory predictor, a trajectory detector, and a data collector.

As shown in block 202, a predicted trajectory model may be generated and applied to the on-board systems of the ego vehicle. The model may be obtained from, or generated using, data from a local or non-local data store 204, as described herein. The predicted trajectory of the ego vehicle may be generated based on previously collected driving data, environmental data, and other models generated on or off-board the ego-vehicle. The trajectory predictor is configured to generate a predicted trajectory of a vehicle, which could be the ego vehicle or another road agent, and may generate a probability level indicating a probability that the vehicle will take the predicted trajectory. According to one aspect, the trajectory predictor may calculate a plurality of predicted trajectories and respective probability levels, and the generated predicted trajectory may take the form of one of the calculated predicted trajectories (with the respective probability level).

As shown in block 206, the ego vehicle may begin to collect vehicle data as it operates according to the predicted trajectory model. The ego vehicle may concurrently or subsequently compare the collected vehicle data associated with the actual trajectory taken by the ego vehicle with the predicted trajectory of the model, as shown in block 208. The trajectory detector may be configured to determine an actual trajectory taken by the vehicle. The detector may include one or more sensors such as LIDAR, RADAR, cameras, photoelectric sensors, as described herein. The detector may be configured to determine the trajectory based on information provided by the sensors.

As shown in block 208, the system may compare the predicted trajectory and the trajectory actually taken by the vehicle and as shown in block 210, determine the differences between the trajectories. According to one aspect, the data collector is configured to select obtained driving data for collection based on a difference level between the generated predicted trajectory and the actual trajectory, and to collect the selected driving data. The data collector may select the obtained driving data for collection based on both the difference level and a probability level of the predicted trajectory. As noted herein, collecting the selected data may include storing the driving data on a data storage of the ego vehicle, sending the driving data to a cloud server (e.g., via wireless transmission), or any combination of these, among other possibilities.

In one embodiment, the data collector selects obtained driving data for collection if the difference level exceeds a threshold amount, as shown in block 212. For example, the predicted trajectory may be a probabilistic prediction with a probability level indicating a high probability that the vehicle will take the predicted trajectory. If, as shown in block 214, the data collector determines that a difference level between the high-probability trajectory and the actual trajectory exceeds a threshold amount (indicating relative dissimilarity between the high-probability and actual trajectories), then the data collector may responsively select obtained driving data and store it for retrieval or transmission, shown in blocks 216 and 218. If the data does not exceed the threshold, shown in block 220, it may be allowed to expired as described herein.

According to another aspect, the data collector may select the obtained driving data for collection if the difference level is below a threshold amount. For example, the predicted trajectory may be a probabilistic prediction with a probability level indicating a low probability that the vehicle will take the predicted trajectory. If the data collector determines that a difference level between the low-probability trajectory and the actual trajectory is below a threshold amount (indicating relative similarity between the low-probability and actual trajectories), then the data collector may responsively select obtained driving data.

According to one aspect, the time that the predicted trajectory is generated by the trajectory predictor may differ from the time that the actual trajectory is determined by the trajectory detector. Accordingly, the difference level may reflect the difference between (for example) an actual trajectory just taken and a trajectory that was predicted several seconds ago (or perhaps another specified time ago).

According to one aspect, the data collector may select which of the obtained driving data to collect based on the difference level. For example, if the difference level indicates a relatively large difference between the predicted and actual trajectories, then the data collector may select a larger amount of the obtained data for collection. If the difference level indicates a relatively small difference, the data collector may select a smaller amount of data for collection. Accordingly, the amount of data collected may be proportional to the amount of data required to determine why the predicted and actual trajectories differed.

Figure 3:
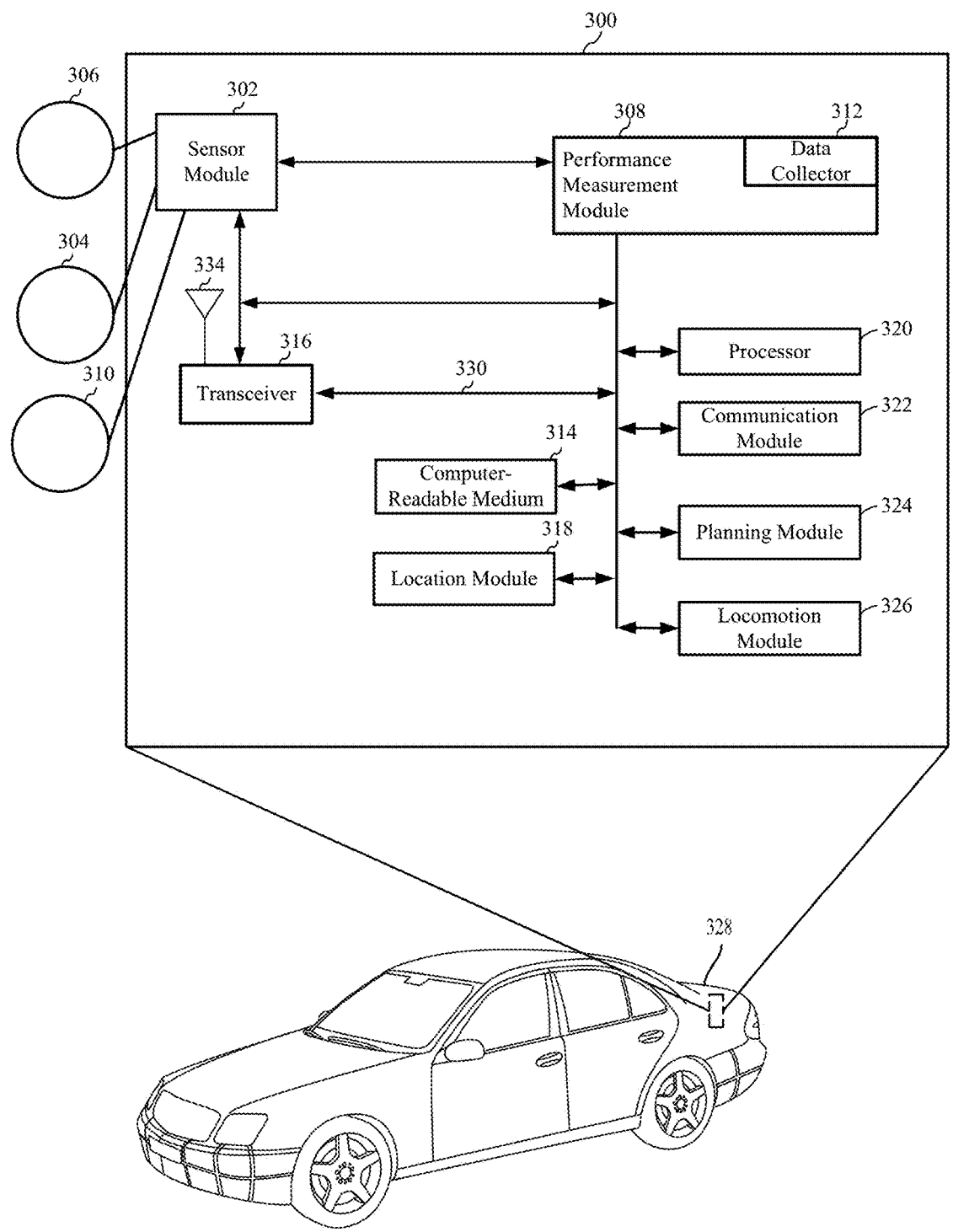
FIG. 3 depicts a hardware implementation for a dynamic map generation system according to aspects of the present disclosure.

FIG. 3 is a diagram illustrating an example of a hardware implementation for a performance measurement system 300, according to aspects of the present disclosure. The performance measurement system 300 may be a component of a vehicle, a robotic device, or other device. For example, as shown in FIG. 3, the performance measurement system 300 may be a component of a car 328. Aspects of the present disclosure are not limited to the performance measurement system 300 being a component of the car 328, as other devices, such as a bus, boat, drone, simulator, or robot, are also contemplated for using the performance measurement system 300. The car 328 may be autonomous or semi-autonomous.

The performance measurement system 300 may be implemented with a bus architecture, represented generally by a bus 330. The bus 330 may include any number of interconnecting buses and bridges depending on the specific application of the performance measurement system 300 and the overall design constraints. The bus 330 may link together various circuits including one or more processors and/or hardware modules, represented by a processor 320, a communication module 322, a location module 318, a sensor module 302, a locomotion module 326, a planning module 324, and a computer-readable medium 314. The bus 330 may also link various other circuits such as timing sources, peripherals, voltage regulators, and power management circuits, which are well known in the art, and therefore, will not be described any further.

The performance measurement system 300 may include a transceiver 316 coupled to the processor 320, the sensor module 302, a performance measurement module 308, a data collector 312, the communication module 322, the location module 318, the locomotion module 326, the planning module 324, and the computer-readable medium 314. The transceiver 316 is coupled to an antenna 334. The transceiver 316 communicates with various other devices over a transmission medium. For example, the transceiver 316 may receive commands via transmissions from a user or a remote device. As another example, the transceiver 316 may transmit driving statistics and information from the map generator 308 to a server (not shown).

The performance measurement module 308 may include the processor 320 coupled to the computer-readable medium 314. The processor 320 may perform processing, including the execution of software stored on the computer-readable medium 314 providing functionality according to the disclosure. The software, when executed by the processor 320, causes the performance measurement system 300 to perform the various functions described for a particular device, such as the car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306, a second sensor 304, and a third sensor 310. The first sensor 306 may be a vision sensor, such as a stereoscopic camera or a red-green-blue (RGB) camera, for capturing 2D images. The second sensor 304 may be a ranging sensor, such as a light detection and ranging (LIDAR) sensor or a radio detection and ranging (RADAR) sensor. The third sensor 310 may include an in-cabin camera for capturing raw video or images of the interior environment of the car 328. Of course, aspects of the present disclosure are not limited to the aforementioned sensors as other types of sensors, such as, for example, thermal, sonar, and/or lasers are also contemplated for either of the sensors 304, 306. The measurements of the sensors 304, 306, 310, 306 may be processed by one or more of the processor 320, the sensor module 302, the performance measurement module 308, the communication module 322, the location module 318, the locomotion module 326, the planning module 324, in conjunction with the computer-readable medium 314 to implement the functionality described herein. In one configuration, the data captured by the first sensor 306 and the second sensor 304 may be transmitted to an external device via the transceiver 316. The sensors 304, 306, 310 may be coupled to the car 328 or may be in communication with the car 328.

The location module 318 may be used to determine a location of the car 328. For example, the location module 318 may use a global positioning system (GPS) to determine the location of the car 328. The communication module 322 may be used to facilitate communications via the transceiver 316. For example, the communication module 322 may be configured to provide communication capabilities via different wireless protocols, such as WiFi, long term evolution (LTE), 3G, etc. The communication module 322 may also be used to communicate with other components of the car 328 that are not modules of the performance measurement module 308.

The locomotion module 326 may be used to facilitate locomotion of the car 328. As an example, the locomotion module 326 may control movement of the wheels. As another example, the locomotion module 326 may be in communication with a power source of the car 328, such as an engine or batteries. Of course, aspects of the present disclosure are not limited to providing locomotion via wheels and are contemplated for other types of components for providing locomotion, such as propellers, treads, fins, and/or jet engines.

The performance measurement system 300 may also include the planning module 324 for planning a predicted route or trajectory or controlling the locomotion of the car 328, via the locomotion module 326. In one configuration, the planning module 324 overrides the user input when the user input is expected (e.g., predicted) to cause a collision. The modules may be software modules running in the processor 320, resident/stored in the computer-readable medium 314, one or more hardware modules coupled to the processor 320, or some combination thereof.

The performance measurement module may be in communication with the sensor module 302, the transceiver 316, the processor 320, the communication module 322, the location module 318, the locomotion module 326, the planning module 324, and the computer-readable medium 314. In one configuration, the performance measurement module

308 may receive sensor data from the sensor module 302. The sensor module 302 may receive the sensor data from the sensors 304, 306, 310. According to aspects of the disclosure, the sensor module 302 may filter the data to remove noise, encode the data, decode the data, merge the data, extract frames, or perform other functions. In an alternate configuration, the map generator 308 may receive sensor data directly from the sensors 304, 306, 310.

As shown in FIG. 3, the performance management module 308 may be in communication with the planning module 324 and the locomotion module 326 to generate a route map, plan a predicted route, and operate the car 328 according to the predicted route or trajectory. As described herein, the performance measurement module 308 may analyze the data from the sensor module 302 and others to determine what data, if any, may be selected and archived by the data collector 312 for retrieval and subsequent analysis and use. The performance measurement module 308 may compare sensor data from the sensor module 302 to a known data set, including a model or trajectory under which the car 328 is currently operating. If the data collector 312 and performance measurement module 308 determine that the data collected is significant, according to a performance measurement obtained or calculated by the system, the data collector 312 may mark or otherwise indicate that data is to be archived for off-loading of the system, as described herein.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of measuring performance of a vehicle, the method comprising:
    applying a pre-defined model to the operation of the vehicle;
    collecting operational data from the vehicle;
    generating a performance measurement from the operational data;
    determining a gain based on the performance measurement; and
    archiving the operational data if the gain meets a threshold; and
    expiring the operational data if the gain does not meet the threshold.

2. The method of claim 1 wherein the pre-defined model is a predicted trajectory of the vehicle.

3. The method of claim 2 wherein the operational data comprises an actual trajectory taken by the vehicle.

4. The method of claim 3 wherein the performance measurement represents the difference between the actual trajectory and the predicted trajectory.

5. The method of claim 4 wherein the threshold comprises a distance between the predicted trajectory and the actual trajectory.

6. The method of claim 1 further comprising transmitting the archived operational data to a non-local data store.

7. The method of claim 1 wherein expiring the operational data comprises deleting the operational data.

8. The method of claim 1 wherein expiring the operational data comprises overwriting the operational data.

9. A system for measuring performance of a vehicle, the system comprising:
    a predictor configured to generate a predicted model;
    a detector configured to detect operational data from the vehicle;
    a processor configured to:
        apply the predicted model to the operation of the vehicle;
        generate a performance measurement from the operational data;
        determine a gain based on the performance measurement; and
    a data collector configured to archive the operational data if the gain meets a threshold, wherein the processor is further configured to expire the operational data if the gain does not meet the threshold.

10. The system of claim 9 wherein the predicted model is a predicted trajectory.

11. The system of claim 10 wherein the operational data comprises actual trajectory data.

12. The system of claim 11 wherein the performance measurement comprises a difference between the predicted trajectory and the actual trajectory data.

13. The system of claim 9 wherein the processor is further configured to transmit the archived operational data to a non-local data store.

14. The system of claim 9 wherein expiring the operational data comprises deleting the operational data.

15. The system of claim 9 wherein expiring the operational data comprises overwriting the operational data.

16. A non-transitory computer-readable medium having program code recorded thereon for determining a performance measurement of a vehicle, the program code executed by a processor and comprising:
   program code to apply a pre-defined model to the operation of the vehicle;
   program code to collect operational data from the vehicle;
   program code to generate a performance measurement from the operational data;
   program code to determine a gain based on the performance measurement,
   program code to archive the operational data if the gain meets a threshold; and
   program code to expire the operational data if the gain does not meet the threshold.

17. The non-transitory computer-readable medium of claim 16 wherein the pre-defined model is a predicted trajectory of the vehicle.

18. The non-transitory computer-readable medium of claim 17 wherein the operational data comprises an actual trajectory taken by the vehicle and the performance measurement comprises a difference between the predicted trajectory and the actual trajectory data.

* * * * *